(12) United States Patent
Stuckler

(10) Patent No.: US 6,708,663 B1
(45) Date of Patent: Mar. 23, 2004

(54) DEVICE FOR BALANCING OUT MASS FORCES IN INTERNAL COMBUSTION ENGINES

(75) Inventor: Johann Stuckler, Heiligenkreuz am Waasen (AT)

(73) Assignee: Steyr-Daimler-Puch Fahrzeugtechnik AG & Co KG, Graz (AT)

( * ) Notice: Subject to any disclaimer, the term of this patent is extended or adjusted under 35 U.S.C. 154(b) by 35 days.

(21) Appl. No.: 10/110,350

(22) PCT Filed: Oct. 12, 2000

(86) PCT No.: PCT/AT00/00263

§ 371 (c)(1),
(2), (4) Date: Apr. 10, 2002

(87) PCT Pub. No.: WO01/27492

PCT Pub. Date: Apr. 19, 2001

(30) Foreign Application Priority Data

Oct. 12, 1999 (AT) .............................. 704/99 U

(51) Int. Cl.[7] ................................................ F02B 75/06
(52) U.S. Cl. .................................................. 123/192.2
(58) Field of Search ........................ 123/192.2, 196 R, 123/192.1; 74/603, 604

(56) References Cited

U.S. PATENT DOCUMENTS

| 4,300,493 A | * | 11/1981 | Berti ....................... 123/192.2 |
|---|---|---|---|
| 4,425,821 A | * | 1/1984 | West ............................ 74/604 |
| 4,690,111 A | * | 9/1987 | Kohno et al. ............. 123/192.2 |
| 4,766,857 A | * | 8/1988 | Laine et al. .............. 123/192.2 |
| 6,189,499 B1 | * | 2/2001 | Iwata et al. .............. 123/192.2 |

* cited by examiner

*Primary Examiner*—Tony M. Argenbright
*Assistant Examiner*—Hyder Ali
(74) *Attorney, Agent, or Firm*—Bachman & LaPointe, P.C.

(57) ABSTRACT

A device for compensating the inertia forces in reciprocating piston machines consists of a balance shaft housing (5) and of balance shafts (6, 7) mounted in the latter in friction bearings (30) and having compensating weights (8), the balance shaft housing (5) being fastened in one part and to the engine block. In order to achieve the highest possible sufficient lubrication along with minimal production costs and simple assembly, a) the friction bearings (30) of the balance shafts (6, 7) are arranged, together with the main bearings (3) of the crankshaft (2), in a plane (9) perpendicular to the crankshaft axis, b) the friction bearings (30) are cylindrical bores in the balance shaft housing (5) which are machined as bearing surfaces (31), c) the balance shafts (6, 7) are cylindrical shafts of essentially constant diameter, on which the compensating weights (8) are fastened individually.

Figure 1:
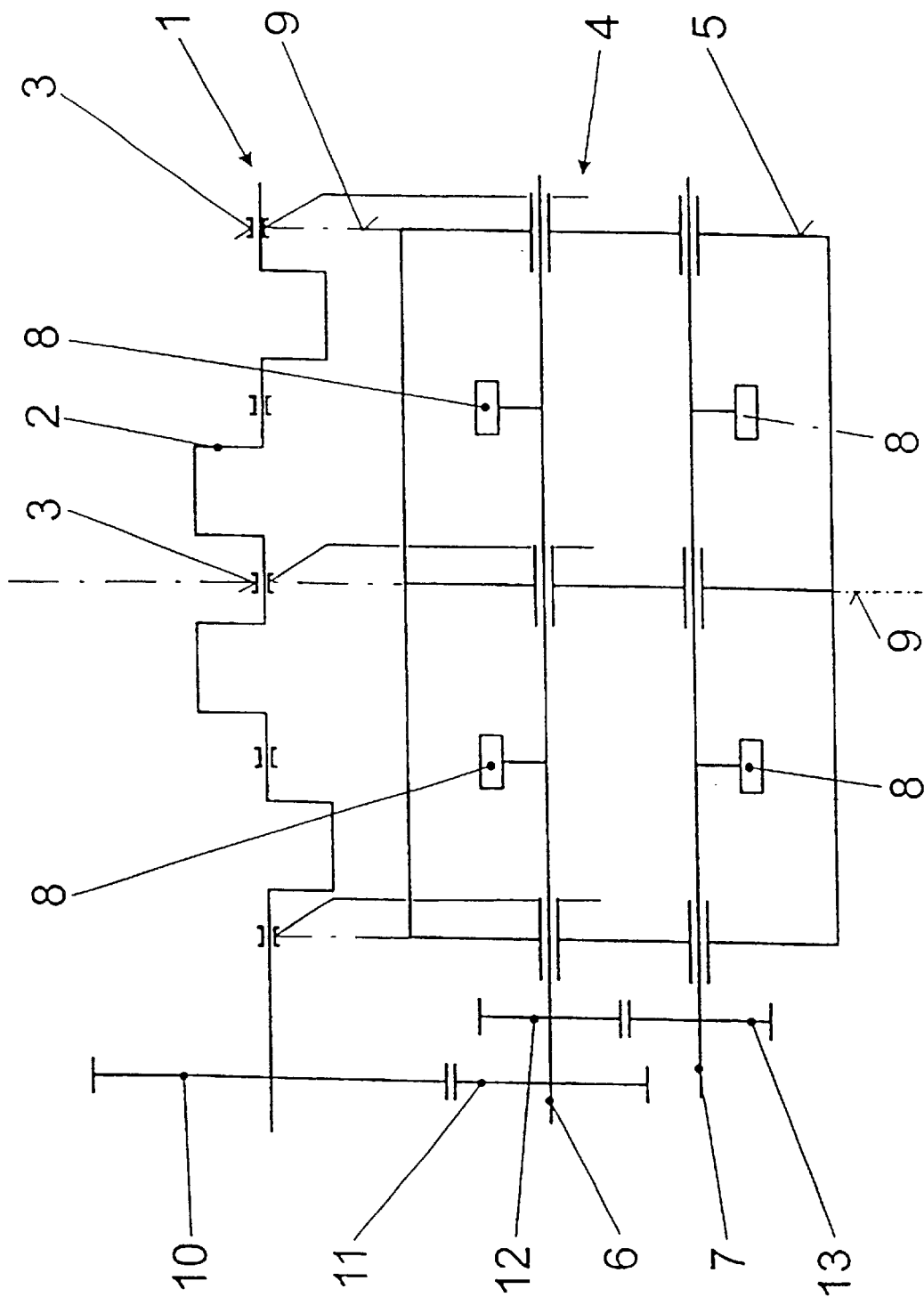

The balance shaft housing (5) is made from light metal and is fastened to the engine block (3) by means of screw bolts (22).

10 Claims, 6 Drawing Sheets

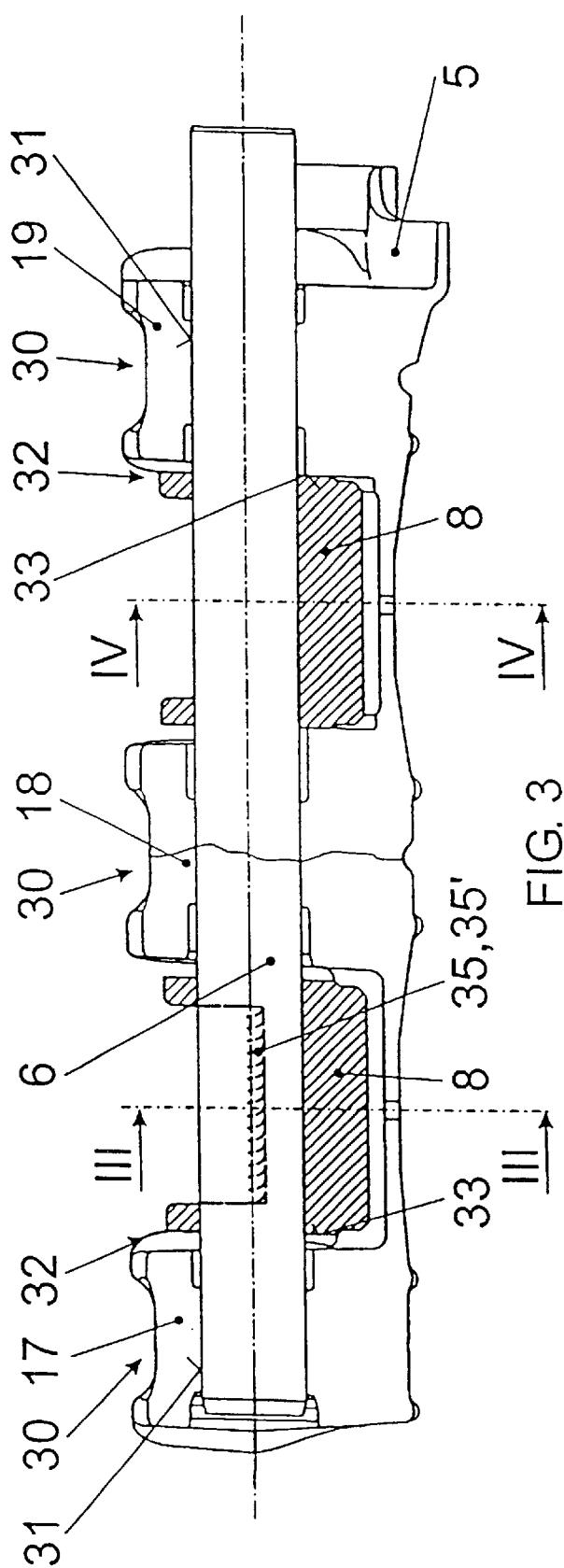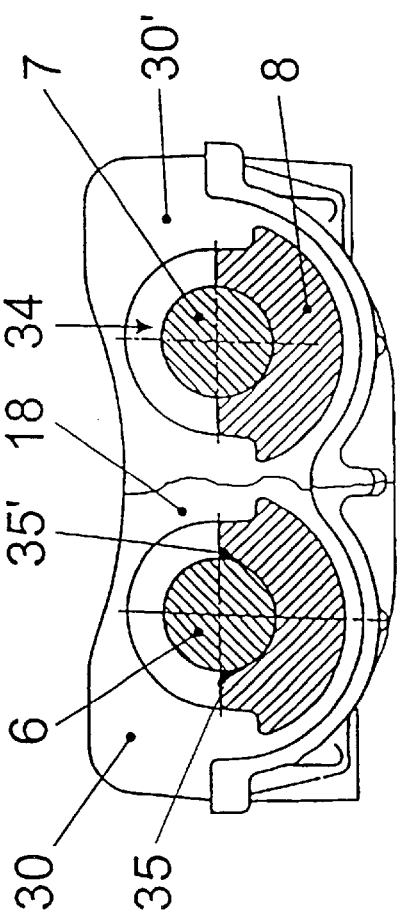
FIG. 3
FIG. 4

DEVICE FOR BALANCING OUT MASS FORCES IN INTERNAL COMBUSTION ENGINES

The invention relates to a device for compensating the inertia forces in reciprocating piston machines, consisting of a balance shaft housing and of a pair of balance shafts mounted in the latter in friction bearings and having compensating weights, the balance shaft housing being fastened in one part and directly or indirectly to the engine block, and the balance shafts being driven from the crankshaft mounted in its main bearings.

The purpose of balance shafts is to compensate inertia forces and moments of inertia occurring in reciprocating piston machines. They are used preferably in high-speed lightweight internal combustion engines, in particular in pairs in engines with four cylinders in series, for compensating second-order inertia forces. In the latter application, they rotate at double the crankshaft rotational speed, that is to say at up to and above 10,000 revolutions.

This means that they must satisfy extreme requirements with regard to precision and mounting and also lubrication. At the same time, however, they are to be as lightweight as possible, inexpensive to produce and easy to assemble, and, in addition, take up as little construction space as possible in the crankcase. In principle, two different forms of construction are possible: either the balance shaft is produced in one part with its compensating weights or it is "built up", the compensating weights being fastened to the finished shaft.

The first is described, for example, in DE 37 05 346 A and the second in U.S. Pat. No. 4,425,821. The one-part form of construction is highly complicated, requires the highest degree of accuracy and, in the case of shafts with more than two bearings, leads to large bearing diameters which present lubrication problems at the high rotational speeds. For these very reasons, rolling bearings are also ruled out. By contrast, built-up balance shafts have, above all, the advantage of allowing smaller bearing diameters, but care must be taken to ensure that the shaft has sufficient rigidity. Moreover, even where more than two bearings are concerned, one-part housings with bearing bushes all round may be used. It is difficult, however, to achieve the highest possible precision, reliable fastening and sufficient unbalance, along with limited outer dimensions. Thus, for example, in the clamping connection of U.S. Pat. No. 4,425,821, the precision, minimum outside diameter and strength of the connection are questionable.

The aim of the invention, therefore, is to design a built-up balance shaft in such a way that, at minimum production cost and with simple assembly, it satisfies the requirements as regards the highest possible precision of the mounting, along with sufficient lubrication, reliable fastening and minimum outer dimensions.

This is achieved, according to the invention, in that
  a) the friction bearings of the balance shafts are arranged, together with the main bearings of the crankshaft, in a plane perpendicular to the crankshaft axis,
  b) the friction bearings are cylindrical bores in the balance shaft housing which are machined as bearing surfaces,
  c) the balance shafts are cylindrical shafts of essentially constant diameter, on which the compensating weights are fastened individually.

On account of a), the balance shaft housing can be fastened simply and the friction bearings can be supplied with lubricating oil of sufficient quantity along the shortest possible path and equally effectively. On account of b), the friction bearings can be machined as accurately as possible at least possible manufacturing cost and with minimal weakening of the balance shaft housing. The minimal weakening of the housing is necessary so as not to impair the precision of the mounting by the distortion of the housing. Shafts of constant diameter according to c) can be produced particularly inexpensively and accurately. The individually fastened compensating weights make it possible to have small bearing diameters and allow simple assembly, they are simply "slipped on" during the introduction of the shaft into the housing and then secured.

If, in a development of the invention, the balance shaft housing consists of light metal and is fastened to the engine block by means of screw bolts, the screw bolts are in each case arranged in pairs in a plane perpendicular to the crankshaft axis through the main bearings (claim 2). By means of this arrangement of the screw bolts, it is possible for the balance shaft housing, consisting of light metal with its higher coefficient of thermal expansion, to be fastened with sufficient precision in an engine block consisting of cast iron. The screwing only in the plane of the main bearings means that the balance shaft housing has a small contact surface on the engine block. It must be remembered that, for this purpose, normal screw bolts are used, not locating bolts. The former allow compensation of the differences in expansion by a slight displacement of the parts in relation to one another which is possible because of the small contact surface. There is therefore no warping of the light-metal housing which would impair the precision of the mounting.

For simplification and to save construction space, it is also within the scope of the invention for the compensating weights to possess at least one axially perpendicular end face which, together with a machined surface of the balance shaft housing, forms a thrust bearing (claim 3). Usually such bearings would be provided on both end faces so that the balance shaft is positioned axially with high precision without additional components.

In a preferred embodiment of the invention, each of the friction bearings is supplied with lubricating oil from the nearest main bearing of the crankshaft (claim 4). Thus, a sufficient oil quantity is apportioned to each bearing along the shortest possible path and therefore with only a small pressure loss. As a result, the bearings do not require a specific supply of lubricating oil through a longitudinal duct which would lead to an uneven distribution of the lubricating oil. This type of oil supply is particularly advantageous when the main bearings are themselves supplied from outside, that is to say not through a longitudinally bored crankshaft.

In a development of this preferred embodiment, the balance shaft housing possesses a first and the main bearing a second vertical lubricating duct which are in alignment with one another and are connected to one another by means of a sleeve (claim 5). The vertical lubricating ducts, of course in relation to the vertical plane of symmetry of the engine, lie in the same plane as the screw bolts and, during assembly, are connected to one another in a very simple way by being slipped onto the sleeve. Moreover, the sleeve can absorb vertical offsets between the balance shaft housing and the engine block. The sleeve can be a very simple tubular piece, because there is no need for particular leak tightness in the crankcase.

In a particularly advantageous arrangement, the first lubricating duct is guided between the friction bearings of the two balance shafts and is connected to the friction bearings by means of tap bores. (claim 6). This arrangement offers the shortest possible connecting paths with low flow resistance, and simple machining.

It is within the scope of the invention, furthermore, for the compensating weight to be a cylindrical ring with two axially perpendicular end faces and with a cutout in the longitudinally central region, so that the compensating weight consists of two ring parts adjoining the two end faces and of a segment part lying between them, and for the compensating weight to be connected firmly to the shaft (claim 7). The edge-side closed rings absorb the tensile force, offer a firm connection with an accurate fit and also stiffen the shaft, and, in the simplest case, they can be shrunk on. The cutout in the longitudinally central region, said cutout extending over virtually half the circumference, allows high mass eccentricity along with a small outside diameter. The segment part surrounds the other half of the circumference. Said segment part bears against the tension zone of the shaft subjected to bending stress and thus considerably increases the rigidity of the latter. Inhibiting deformation in this way by an increase in the moment of resistance is beneficial to the shaft because of reduced bending stresses and to the bearings because of a better carrying profile on account of the lower flexion. The shafts can therefore be produced with a smaller diameter. Thus, overall, along with precise mounting, smaller outer dimensions can be achieved.

If the mass eccentricity which can be achieved in this way is not sufficient, with only a slight increase in the outside diameter the compensating weight can have, on the side facing away from the cutout, a thickening which increases the eccentric mass (claim 8).

In an advantageous design variant, the compensating weight is connected to the balance shaft in the cutout by means of an energy beam weld seam which is made on both sides at the intersection of the cutout plane with the balance shaft (claim 9). A particularly rapid and reliable connection is thus made, which, in the case of weld seams located opposite one another and produced preferably with a laser, is also completely free of distortion.

In another advantageous design variant, the balance shaft has at least one first transverse bore which is in alignment with at least one second transverse bore of the compensating weight, said two bores receiving an essentially cylindrical connecting element (claim 10).

Figure 2:
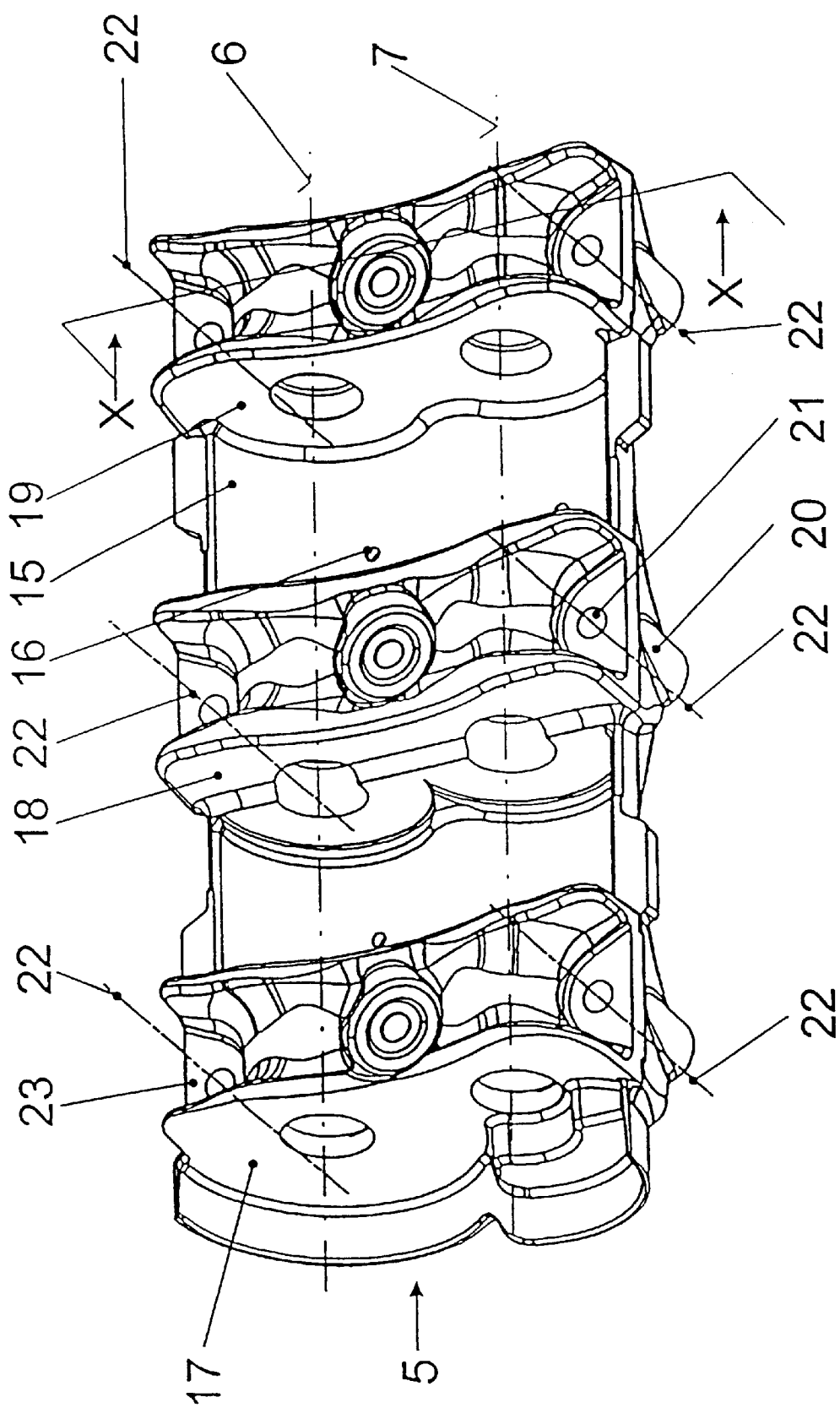
Figure 5:
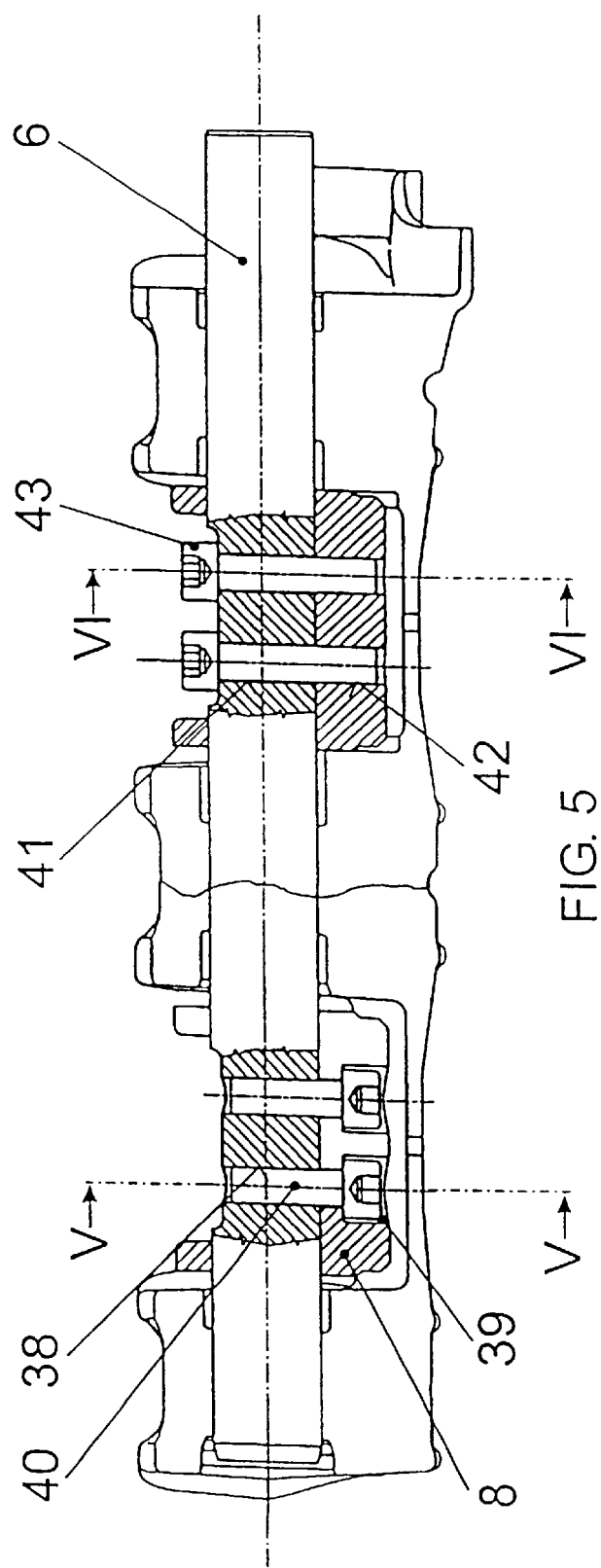
Figure 6:
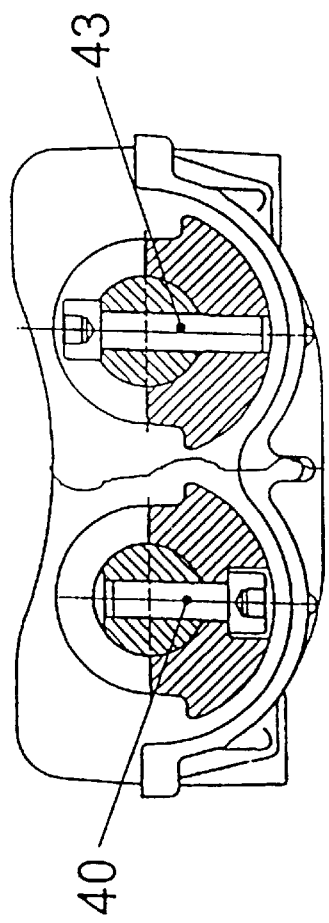
Figure 7:
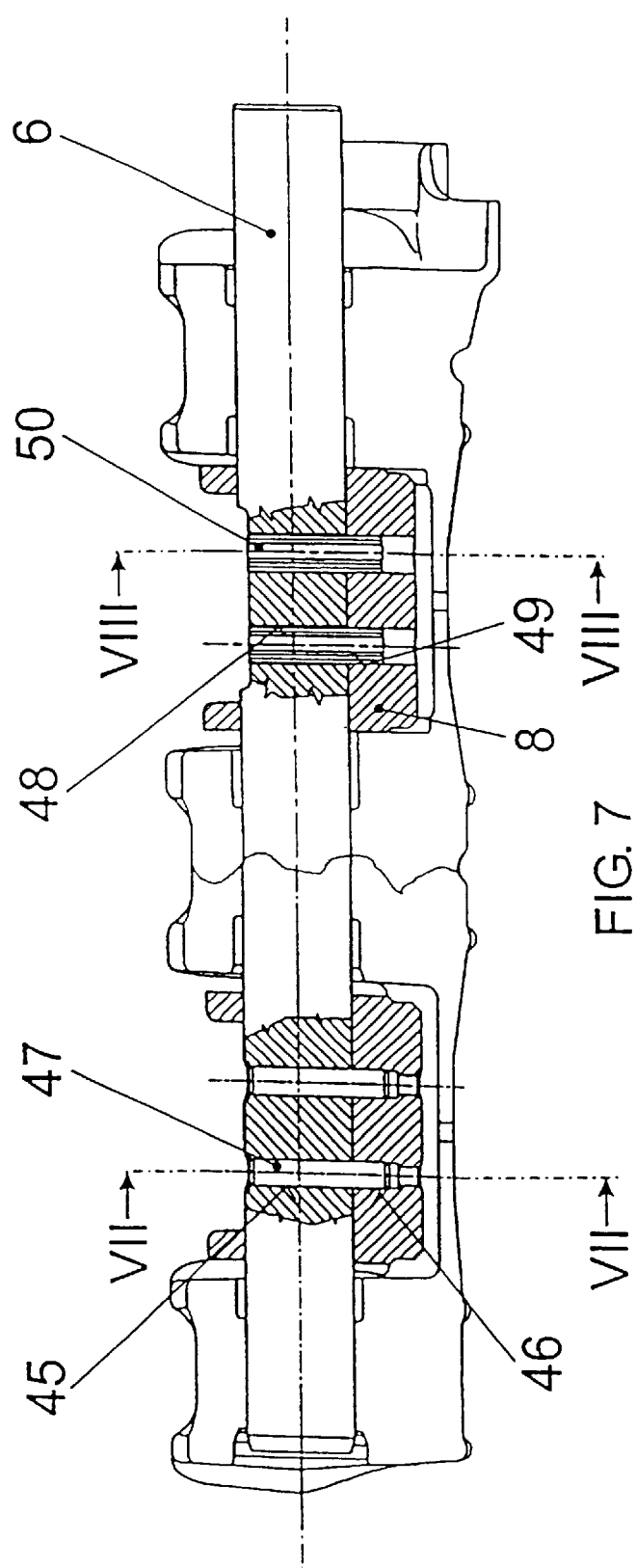
Figure 8:
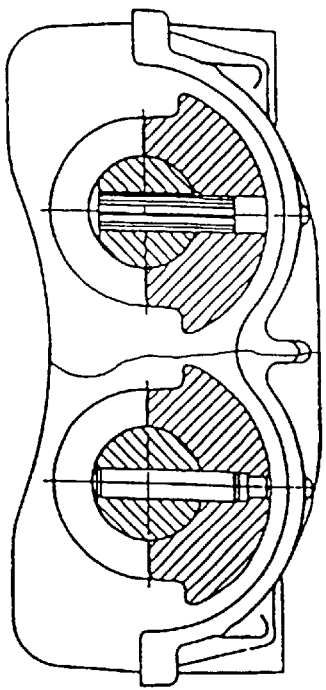

The invention is described and explained below with reference to figures, of which:

FIG. 1 shows a diagram of an arrangement of a unit according to the invention,

FIG. 2 shows an axonometric view of a balance shaft housing as part of the unit according to the invention, in a top view, FIG. 3 shows a longitudinal section through a unit according to the invention in a first and a second embodiment, FIG. 4 shows a cross section according to III—III and IV—IV in FIG. 3, FIG. 5 shows a longitudinal section through a unit according to the invention in a third and fourth embodiment, FIG. 6 shows a cross section according to V—V and VI—VI in FIG. 5, FIG. 7 shows a longitudinal section through a unit according to the invention in a fifth and sixth embodiment, FIG. 8 shows a cross section according to VII—VII and VIII—VIII in FIG. 7.

Figure 9:
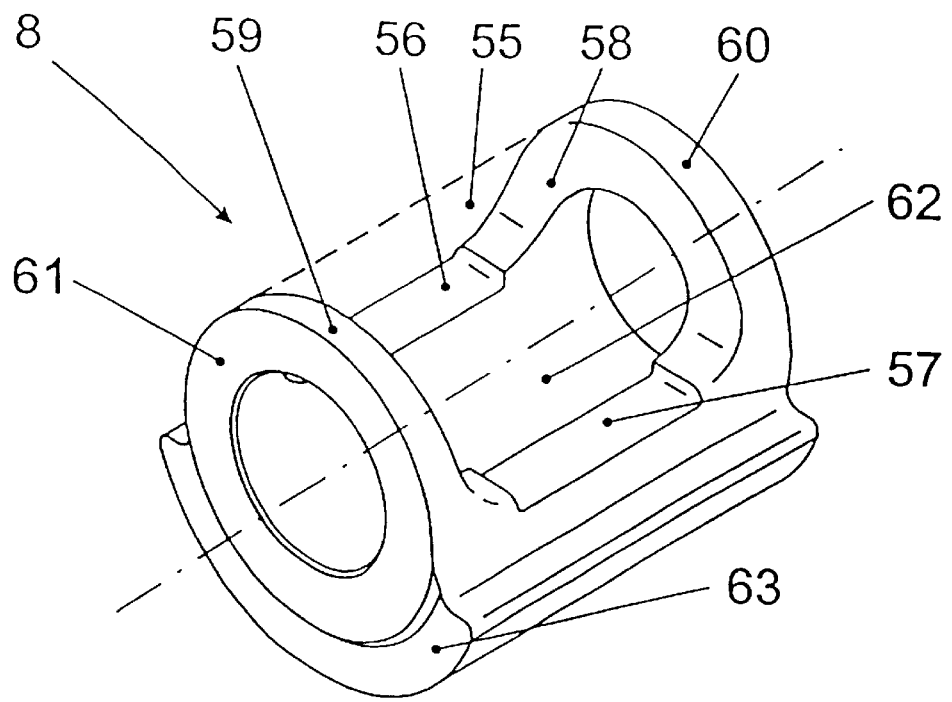
Figure 10:
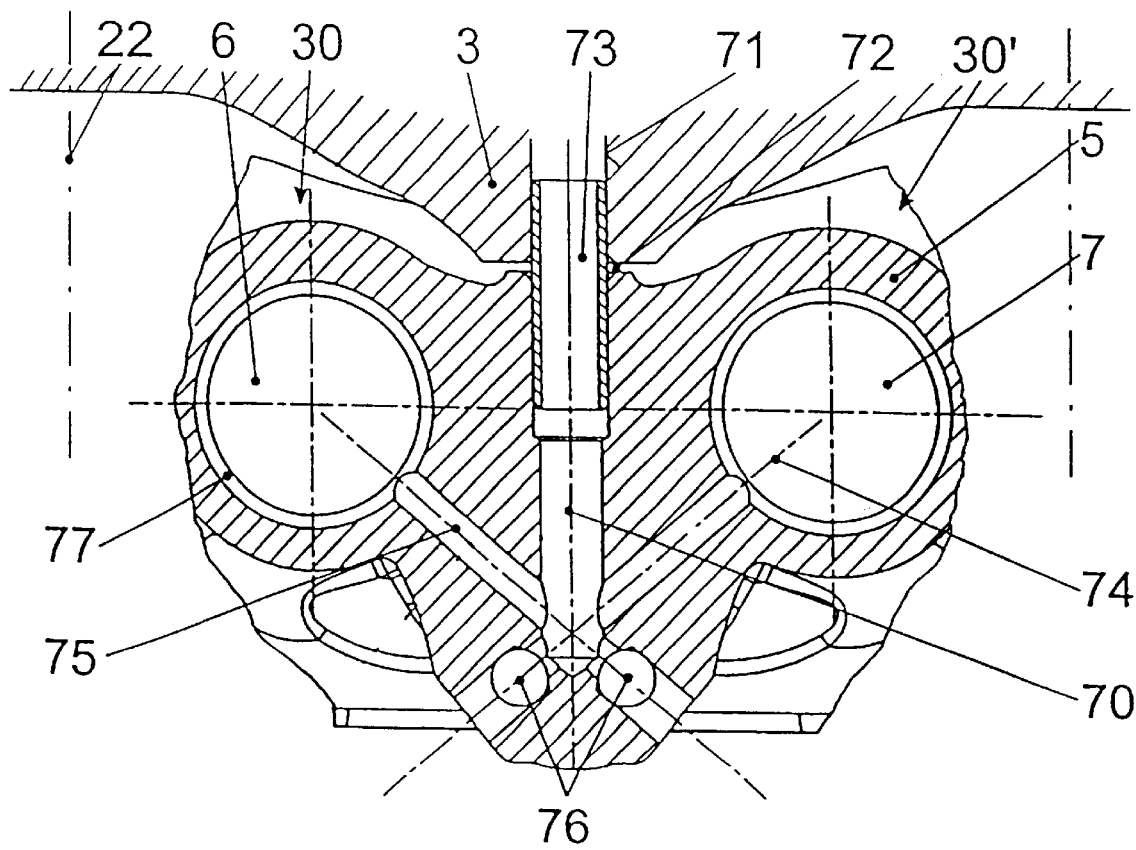

FIG. 9 shows an axonometric view of a compensating weight according to the invention, and FIG. 10 shows a cross section according to X—X in FIG. 2, enlarged.

In FIG. 1, the reciprocating piston machine 1 is symbolized only by its crankshaft 2 and the main bearings 3 of the latter. The main bearings 3 represent the entire engine block which may be designed both in the tunnel form of construction and with free bearing bridges. The mass-compensating device fastened to the engine block below the crankshaft 2 is designated in general by 4. It consists of a balance shaft housing 5 and of two balance shafts 6, 7 rotating in opposition therein and having compensating weights 8. Broken lines indicate the perpendicular planes 9 through the bearings 3, in which planes also lie the bearings of the mass-compensating device 4 which are yet to be described. The balance shafts 6, 7 are driven via a driving gearwheel 11 by a gearwheel 10 connected fixedly in terms of rotation to the crankshaft 2, and the synchronous wheels 12, 13 ensure the same rotational speed in opposite directions.

FIG. 2 shows the balance shaft housing 5 which, in the exemplary embodiment illustrated, is a casting consisting of light metal. It consists of a bottom shell 15 with oil outflow holes 16 and a number of bearing bridges 17, 18, 19. Each bearing bridge has on its two sides an integrally cast portion 20 with a vertical bore 21 in each case for a screw bolt 22, merely indicated, by means of which the balance shaft housing 5 is screwed to the engine block. For this purpose, contact surfaces 23 are provided in the vicinity of the bores 21. The assembled balance shaft housing is connected via these contact surfaces to the corresponding points in the engine block which are located in a perpendicular plane 9, common to the bearing bridges 17, 18, 19. The connection, not specifically illustrated, is made either to the transverse ribs of the engine block which are formed by the bearing seat of the main bearing or to the bearing bridges of the main bearing or, in the case of a tunnel design, to said main bearing.

FIG. 3 is a vertical longitudinal section through the first balance shaft 6 which, by virtue of the special features of the form of construction described, may be a simple purely cylindrical shaft of constant diameter. The three bearing bridges 17, 18, 19 form friction bearings 30 for the mounting of the balance shaft 6. They have the particular feature that bearing surfaces 31 for radial mounting are machined in the basic material of the balance shaft housing 5 or of the bearing bridges, without a specific bearing bush being required. Thrust bearings 32 are formed on the two outer bearing bridges 17, 19, for which purpose finely machined bearing surfaces 33 are likewise provided on the basic material.

The compensating weights 8 may be fastened on the balance shafts 6, 7 in various ways. In this respect, in each case two different types of fastening are illustrated in the longitudinal sections of FIGS. 3, 5 and 7, and, in FIGS. 4, 6 and 8, the two balance shafts 6, 7 are in each case assigned correspondingly to one embodiment and the other. It goes without saying, however, that the same type of fastening will normally be selected for the two balance shafts and all the compensating weights.

In FIG. 3, on the right side, the compensating weight 8 is simply shrunk (34) onto the balance shaft 6 and, on the left side, it is connected by means of two longitudinally directed laser weld seams arranged diametrically opposite one another. In this arrangement of the weld seams and when a closely focused high-energy beam is used, the balance shaft 6 remains free of distortion.

FIG. 5 and FIG. 6 show two further types of connection between the balance shaft 6 and the compensating weight 8. On the left side, a threaded bore 38 is provided in the balance shaft 6 and the compensating weight 8 has provided in it a locating bore with a countersink 39, through which one or two locating screws 40 are screwed in from the side of the compensating weight. The situation is reversed on the right side: locating screws 43 are screwed in through a bore 41 in the balance shaft 6 and a threaded bore 42 in the compensating weight 8.

In FIGS. 7 and 8, the connection is made via a locating bore 45 in the balance shaft 6 and a preferably stepped locating bore 46 in the compensating weight 8, at least one locating pin 47 (there are two here) being driven into said locating bores during assembly. On the right side are provided two locating bores 48, 49 of the same diameter, into which two tension bushes 50 are inserted during assembly.

FIG. 9 shows the compensating weight 8 in detail. Its basic shape is that of a cylindrical ring or of a hollow cylinder with a thick wall, this being indicated by broken lines. It can be manufactured in various ways, for example forged or by lost-wax casting. Regardless of this, the explanation refers to the shape of a lantern-like cutout 55 which is made over part of the length and approximately over half the circumference. The cutout 55 is delimited by two cutout planes 56, 57 and by lateral cutout surfaces 58. The cutout planes 56, 57 are essential when the connection to the shaft is made by means of laser welding, the weld seam then coming to lie at the line of intersection of the cutout planes 56, 57 with the cylinder of the balance shaft 6. Two ring parts 59, 60 are left, which adjoin the cutout 55 on both sides in the longitudinal direction and are closed rings and which absorb centrifugal forces and, in the case of a shrink connection, also the circumferential forces generating the shrinkage tension. The ring parts 59, 60 each have, on the outside, an end face 61 which, in interaction with the bearing surface 33 of the bearing bridge 17, forms a thrust bearing 32. The cutout 55 extends approximately over a semicircle, and a segment part 62 which forms the eccentric mass is located in the remaining semicircle. Since there is no material at all between the ring parts 59, 60 on the side of the cutout 55, high eccentricity can be achieved with only a small thickness of the segment part 62. If this is not sufficient, a thickening 63 may additionally also be formed.

FIG. 10 shows mainly the oil supply. The main bearing 3 and consequently the entire engine block are merely indicated. The main bearing itself is located above the figure and can no longer be seen. The balance shaft housing 5 is also illustrated only partially, and the screw bolts 22, by means of which it is screwed to the engine block or main bearing 3, are indicated only by a dashed and dotted line. The section is taken in the bearing bridge 19 (FIG. 2). A first vertical lubricating duct 70 is located in the balance shaft housing 5, is parallel to the screw bores 21 (FIG. 2) and may be drilled together with these in a chucking fixture. A second vertical lubricating duct 71 is provided in the main bearing 3 or engine block and is in alignment with the first, but terminates at a short distance 72 from the latter. As a result, for example, displacements caused by thermal expansion are absorbed in such a way that they cannot lead to any distortion of the balance shaft housing 5. The two lubricating ducts 70, 71 are connected by means of an inserted sleeve 73. The first vertical lubricating duct 70 may be designed as a blind hole, but leads under the plane in which the two balance shafts 6, 7 are located. The connection to the bearings 30 is made by means of tap bores 74, 75 leading upward again. They intersect the lubricating duct 70 and can be drilled from below into the balance shaft housing 5. They are closed relative to the outside by means of pressed in balls 76 and issue into an oil distribution groove 77 of the friction bearing 30.

Each friction bearing of the balance shafts 6, 7 is thereby supplied with lubricating oil in a large quantity and at an equally high pressure from the assigned main bearing of the crankshaft. This ensures that they run accurately, virtually free of play and with minimal frictional losses.

What is claimed is:

1. A device for compensating the inertia forces in reciprocating piston machines, consisting of a balance shaft housing and of a pair of balance shafts (6, 7) mounted in the latter in friction bearings and having compensating weights (8), the balance shaft housing (5) being fastened in one part and directly or indirectly to the engine block, and the balance shafts being driven from the crankshaft mounted in its main bearings (3), wherein a) the friction bearings (30) of the balance shafts (6, 7) are arranged, together with the main bearings (3) of the crankshaft (2), in a plane (9) perpendicular to the crankshaft axis, b) the friction bearings (30) are cylindrical bores in the balance shaft housing (5) which are machined as bearing surfaces (31), c) the balance shafts (6, 7) are cylindrical shafts of essentially constant diameter, on which the compensating weights (8) are fastened individually.

2. The device for compensating inertia forces as claimed in claim 1, wherein the balance shaft housing (5) consists of light metal and is fastened to the engine block (3) by means of screw bolts (22), the screw bolts being arranged in each case in pairs in a plane (9) perpendicular to the crankshaft axis through the main bearings (3).

3. The device for compensating inertia forces as claimed in claim 1, wherein the compensating weights (8) possess at least one axially perpendicular end face (61) which, together with a machined surface (33) of the balance shaft housing (5), forms a thrust bearing (32).

4. The device for compensating inertia forces as claimed in claim 1, wherein each of the friction bearings (30, 32) is supplied with lubricating oil from the nearest main bearing (3) of the crankshaft.

5. The device for compensating inertia forces as claimed in claim 4, wherein the balance shaft housing (5) possesses a first (70) and the main bearing (3) a second (71) vertical lubricating duct (70, 71) which are in alignment with one another and are connected to one another by means of a sleeve (73).

6. The device for compensating inertia forces as claimed in claim 5, wherein the first lubricating duct (70) is guided between the friction bearings (30, 30') of the two balance shafts (6, 7) and is connected to the friction bearings (30, 30') by means of tap bores (74, 75).

7. The device for compensating inertia forces as claimed in claim 3, wherein the compensating weight (8) is essentially a cylindrical ring with two axially perpendicular end faces (61) and with a cutout (55) in the longitudinally central region, so that the compensating weight consists of two ring parts (59, 60) adjoining the two end faces and of a segment part (62) lying between them.

8. The device for compensating inertia forces as claimed in claim 7, wherein the compensating weight (8) has, on the side facing away from the cutout (55), a thickening (63) which increases the eccentric mass.

9. The device for compensating inertia forces as claimed in claim 7, wherein the compensating weight (8) is connected to the shaft (6, 7) in the cutout (55) by means of an energy beam weld seam (35, 35') which is made on both sides at the intersection of the cutout plane (56, 57) with the shaft (6, 7).

10. The device for compensating inertia forces as claimed in claim 7, wherein the shaft has at least one first transverse bore (38; 41; 45; 48) which is in alignment with at least one second transverse bore (39; 42; 46; 49) of the compensating weight, said two bores receiving an essentially cylindrical connecting element (40; 43; 47; 50).

\* \* \* \* \*